Patented Aug. 25, 1953

2,650,241

UNITED STATES PATENT OFFICE 2,650,241

FOLIC ACID INTERMEDIATE PREPARATION

David I. Weisblat and Ethel I. Fairburn, Kalamazoo, Mich., assignors to The Upjohn Company, Kalamazoo, Mich., a corporation of Michigan No Drawing. Application August 19, 1950, Serial No. 180,507

10 Claims. (Cl. 260—470)

This invention relates to an improved method for the preparation of intermediate compounds useful in making compounds of the folic acid type, particularly to a method for oxidizing certain hydroxy compounds to the corresponding keto compounds.

According to the method of the invention hydroxy Compounds I, herein referred to as N-(2-hydroxypropyl)-p-aminobenzoate compounds, having the formula

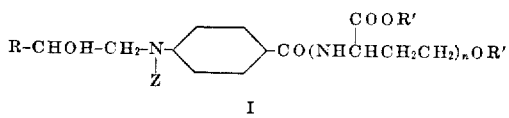

I

N-(2-hydroxypropyl)-p-aminobenzoate compound are oxidized to keto Compounds II, herein referred to as N-(2-ketopropyl)-p-aminobenzoate compounds having the formula

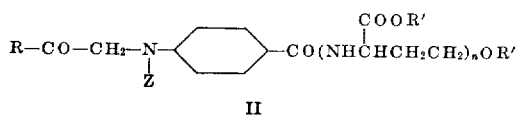

II

N-(2-ketopropyl)-p-aminobenzoate compound

In the formulae just given, and in subsequent formulae given herein, R' is selected from the group consisting of hydrogen and the alkyl radicals, $n$ is selected from the group consisting of zero and the positive integers 1 to 7, inclusive, Z is selected from the group consisting of hydrogen and the arylsulfonyl radicals and R is selected from the group consisting of the alkyl, dialkoxymethyl, alkoxymethyl, aryloxymethyl, aralkoxymethyl and acyloxymethyl radicals.

The N-(2-ketopropyl)-p-aminobenzoate Compounds II, certain of which have been described and claimed in copending application Serial No. 63,453, certain others of which have been described and claimed in copending application Serial No. 41,889, and certain others of which have been described and claimed in concurrently filed copending application Serial No. 180,501, are useful in the preparation of certain compounds referred to broadly in the art as "folic acids."

Thus, as described and claimed in copending application, Serial No. 41,882, diethyl N'-(N-(3-acetoxy-2-ketopropyl-N-(p-toluenesulfonyl)-p-aminobenzoyl)-glutamate, which can be prepared by the method of the present invention, can be condensed with 2,4,5-triamino-6-hydroxypyrimidine to form diethyl N'-(N((2-amino-4-hydroxy-6-pteridyl)-methyl-N-(p-tol- uenesulfonyl)-p-aminobenzoyl)-glutamate. The latter compound, upon treatment with hydrogen bromide in an aliphatic acid medium, and in the presence of a bromine acceptor to prevent bromination of the benzene nucleus of the aminobenzoic acid residue according to the method described and claimed in copending application, Serial No. 41,883, and after subsequent hydrolysis of the ester groups, is converted to N'-(N-((2-amino -4- hydroxy-6-pteridyl) - methyl-p-aminobenzoyl)-glutamic acid (pteroylglutamic acid) generally recognized, when the glutamate acid residue has the same configuration as $1(+)$-glutamic acid, as being identical with the "L. casei factor or vitamin Bc from liver. When N'-(N-(3-acetoxy-2-ketopropyl) -p- aminobenzoyl)-glutamic acid is condensed with 2,4,5-triamino-6-hydroxy-pyrimidine, pteroylglutamic acid is formed directly without the necessity of splitting a sulfonyl radical from the product with hydrogen bromide or of hydrolyzing ester groups. In similar fashion other N-(2-ketopropyl)-p-aminobenzoate Compounds II wherein R is an alkoxymethyl, aralkoxymethyl, or an aryloxymethyl radical which can be prepared by the method of the invention can be condensed with 2,4,5-triamino-6-hydroxypyrimidine to form the corresponding 2-amino-4-hydroxy -6- pteridyl compounds of the folic acid type in the manner just described.

The reaction of certain of the N-(2-ketopropyl)-p-amino-benzoate Compounds II, wherein R of the formula given is a dialkoxymethyl radical, with 2,4,5-triamino-6-hydroxyrimidine following a somewhat similar method is described and claimed in copending application Serial No. 63,453. The N-(2-ketopropyl)-N-(arylsulfonyl)-p-aminobenzoate Compounds II wherein R is the methyl radical, can be oxidized to the corresponding N-(2-formyl-2-ketoethyl) -N- (arylsulfonyl)-p-aminobenzoate compounds with selenium dioxide and the latter condensed with 2,4,5-triamino-6-hydroxypyrimidine to form compounds of the folic acid type according to the method described and claimed in concurrently filed, copending application Serial No. 180,509. Oxidation with selenium dioxide of an N-(2-ketopropyl) -N- (arylsulfonyl)-p-aminobenzoate Compound II wherein R is an alkyl radical having more than one carbon atom leads to the formation of an N-(3 alkyl-2-3-diketopropyl) -N- (p-toluenesulfonyl)-p-aminobenzoate compound and the latter, when condensed with 2,4,5-triamino-6-hydroxypyrimidine, leads to the formation of a compound related to folic acid having an alkyl substituent on the pterine nucleus.

These compounds appear to be of interest pharmacologically.

The oxidation of an N-(2-hydroxypropyl)-p-aminobenzoate Compound I wherein R of the formula given represents a dialkoxymethyl radical to give the corresponding N-(2-ketopropyl)-p-aminobenzoate Compound II using chromic anhydride in a homogeneous reaction mixture, e. g. in an aliphatic acid medium, has been described and claimed in copending application Serial No. 63,453. The oxidation following a similar procedure of other N-(2-hydroxypropyl)-p-aminobenzoate Compounds I wherein R of the formula given is an alkoxmethyl, aryloxymethyl, aralkoxymethyl or an acyloxymethyl radical to form the corresponding N-(2-ketopropyl)-p-aminobenzoate Compound II has been described and claimed in copending application Serial No. 41,889. In similar fashion, also, the oxidation of an N-(2-hydroxypropyl)-p- aminobenzoate Compound I wherein R is an alkyl radical is described and claimed in concurrently filed copending application Serial No. 180,501.

The oxidation, however, of an N-(2-hydroxypropyl)-p-aminobenzoate compound in a homogeneous reaction mixture using chromic anhydride as the oxidizing agent leaves much to be desired as regards the yield of N-(2-ketopropyl)-p-aminobenzoate compound obtained. Furthermore, the reaction is generally carried out in a large amount of an acetic acid or other aliphatic acid medium and this offers certain difficulties in the recovery of the N-(2-ketopropyl)-p-aminobenzoate compound formed. Also, it is known that oxidation reactions using chromic anhydride and glacial acetic acid must be carried out with great care to prevent a violent or explosive reaction with consequent hazard to the operator and decomposition of the valuable components of the mixture.

It has now been found that superior yields of N-(2-ketopropyl)-p-aminobenzoate Compounds II can be obtained readily and the product isolated more conveniently by dissolving an N-(2-hydroxypropyl)-p-aminobenzoate Compound I in a substantially water-immiscible organic liquid which is non-reactive under the reaction conditions, i. e., which is not subject to oxidation nor to reaction with either the starting hydroxy compound or the formed keto compound under the reaction conditions, and mixing the solution with an aqueous acid solution of a metal dichromate. The mixing is advantageously carried out with vigorous agitation and at a temperature between about −10° and about 30° C., preferably between about 0° and about 10° C. Under such conditions the oxidation proceeds smoothly and rapidly and with the formation of a minimum amount of undesirable by-products.

The reaction mixture can be worked up in any convenient way to recover the N-(2-ketopropyl)-p-aminobenzoate compound which is formed. One convenient way comprises allowing the mixture to stand until it separates into an aqueous and an organic layer and then separating the layers. N-(2-ketopropyl)-p-aminobenzoate compounds wherein the aromatic amino group is protected with an arylsulfonyl radical will generally be found principally in the organic layer whereas the free amines are usually in the acid aqueous layer. The organic layer can be washed with water and dried, e. g. with anhydrous sodium sulfate, and the organic liquid distilled to recover the arylsulfonylamino compound. In many instances, the drying step is unnecessary since the small amount of water remaining in the layer generally vaporizes during the distillation of the organic liquid. There is thus obtained an oily or crystalline residue containing a high proportion of the N-(2-ketopropyl)-p-aminobenzoate compound which is generally in a form sufficiently pure for use without further purification. The N-(2-ketopropyl)-p-aminobenzoate compounds which are free amines can be recovered from the acid aqueous layer by adjusting the pH of the mixture to decompose the amine salt and extracting the free amine with ethyl acetate or other suitable solvent. Subsequent drying and volatilization of the solvent from the extract leaves the amine, usually as an oily product. The N-(2-ketopropyl)-p-aminobenzoate compound can be purified further, if desired, in any suitable way depending upon the particular product involved, e. g. by crystallization from a suitable solvent, by forming and crystallizing a suitably crystalline semi-carbazone or other derivative which can subsequently be decomposed easily to regenerate the N-(2-ketopropyl)-p-aminobenzoate compound or by chromatography.

Organic liquids which can be used as a solvent for the N-(2-hydroxypropyl)-p-aminobenzoate compound during the oxidation include, among many others, chloroform, benzene, toluene and chlorobenzene. The organic liquid should preferably be a liquid in which both the hydroxy compound which is oxidized and the keto compound which is formed are soluble. Preferred liquids are the aromatic and halogenated aromatic hydrocarbons. Any convenient proportions of the hydroxy compound and of the organic liquid can be employed.

Metal dichromates which can be used include sodium, potassium, calcium, magnesium and many others including the dichromates of many of the heavy metals. It is preferable for convenience in working up the reaction product that the metal dichromate used be a compound which is soluble in an aqueous acid solution and that no insoluble compound be formed in the reaction mixture e. g. by the reaction between the metal dichromate and the aqueous acid or other components of the reaction mixture. For these reasons the alkali metal dichromates are preferred and especially sodium dichromate due to its ready availability and low cost.

Acids which can be used to acidify the aqueous dichromate solution include sulfuric, phosphoric and many other inorganic acids. Acids which are oxidized by the metal dichromate are preferably avoided. In certain instances an aliphatic acid, such as acetic, propionic or butyric acid or a mixture thereof can be used in place of or in combination with an inorganic acid. In such instance the aliphatic acid can, if desired, be dissolved along with the hydroxy compound which is to be oxidized in the organic liquid from which it will be at least partially extracted by the aqueous dichromate solution during the mixing operation. A wide range of concentrations of aqueous acid can be used, the actual concentration depending somewhat upon the particular acid and metal dichromate used, the particular hydroxy compound being oxidized and other factors. Aqueous sulfuric acid of from about 5.0 to about 12 molal concentration has been used with satisfaction but more dilute or more concentrated solutions can be used, if desired.

The reaction is generally substantially complete in from a few minutes to several hours, depending upon the reaction temperature, during which time the agitation of the mixture is preferably continued. The reaction is generally carried out by adding the solution of the hydroxy compound in the organic liquid to the aqueous solution of the metal dichromate with vigorous agitation but this exact procedure is not essential.

Certain of the N-(2-hydroxypropyl)-p-aminobenzoate compounds, i. e. the N-(3,3-dialkoxy-2-hydroxypropyl) - N - (arylsulfonyl) - p - amino - benzoate Compounds III having the formula

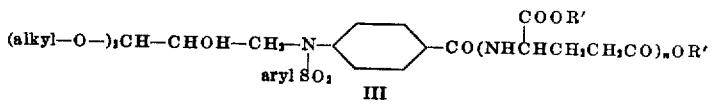

N-(3,3-dialkoxy-2-hydroxypropyl)-N-(arylsulfonyl)-p-aminobenzoate compound and the N - (3,3 - dialkoxy - 2 - hydroxypropyl) - p-aminobenzoate Compounds IV having the formula

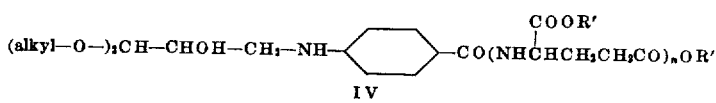

N-(3,3-dialkoxy-2-hydroxypropyl)-p-aminobenzoate compound which are useful as starting materials in the process of the present invention, are described and claimed, and a method for their preparation is given, in copending application Serial No. 63,453. According to the method therein described an N-(3,3-dialkoxy-2-hydroxypropyl)-N-(arylsulfonyl)-p-aminobenzoate compound is formed readily by reacting a dialkyl acetal of 2,3-oxidopropanal (V) having the formula

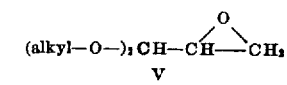

Dialkylacetal of 2,3-oxidopropanal with an N-(arylsulfonyl)-p-aminobenzoate ester Compound VI having the formula

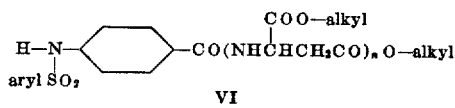

N-(arylsulfonyl)-p-aminobenzoate ester compound

The reaction is conveniently carried out by heating the substances together, the resulting product being an ester corresponding to the N-(arylsulfonyl)-p-aminobenzoate ester compound used. The ester thus formed can be hydrolyzed readily with alkali to form the free acid, and either the ester or the acid can be treated with hydrogen bromide in an aliphatic acid medium, and in the presence of a bromide acceptor, according to the method described and claimed in copending application Serial No. 41,883 to split the arylsulfonyl radical from the molecule and form the corresponding free amine.

Certain others of the N-(2-hydroxypropyl)-p-aminobenzoate Compounds I i. e. the N-(3-alkoxy-2-hydroxypropyl)-p-aminobenzoate Compounds VII having the formula

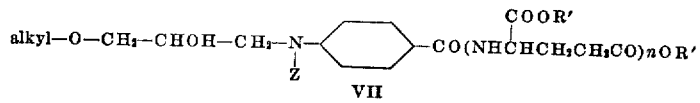

N-(3-alkoxy-2-hydroxypropyl)-p-aminobenzoate compound the N - (3 - aryloxy - 2 - hydroxypropyl) - p - aminobenzoate Compounds VIII having the formula

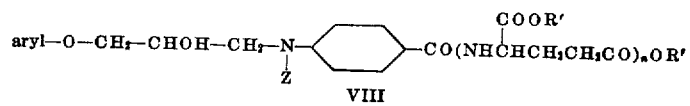

N-(3-aryloxy-2-hydroxypropyl)-p-aminobenzoate compound the N - (3 - aralkoxy - 2 - hydroxypropyl) - p - aminobenzoate Compounds IX having the formula

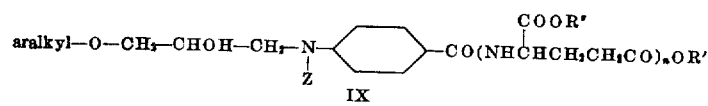

N-(3-aralkoxy-2-hydroxypropyl)-p-aminobenzoate compound and the N-(3-acyloxy-2-hydroxypropyl)-p-aminobenzoate Compounds X having the formula

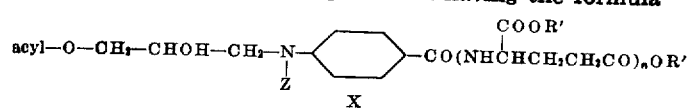

N-(3-acyloxy-2-hydroxypropyl)-p-aminobenzoate compound which are also useful as starting materials in the process of the present invention are described and claimed, and a method for their preparation is given, in copending application Serial No. 41,890. According to the method there described a p-aminobenzoate ester Compound XI having the formula

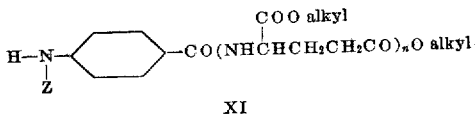

XI p-Aminobenzoate ester compound is reacted with 1,2-epoxypropyl Compound XII having the formula

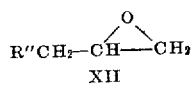

XII 1,2-epoxypropyl compound wherein R'' is selected from the class consisting of the alkoxy, aryloxy, aralkoxy and acyloxy radicals. The reaction is carried out conveniently by warming the reactants together, generally with the addition of a small proportion of a tertiary amine to catalyze the reaction. Hydrolysis of the ester gives the free acid in good yield.

Still others of the N-(2-hydroxypropyl)-p-aminobenzoate Compounds I i. e. the N-(2-methyl-2-hydroxyethyl)-p-aminobenzoate Compounds XIII having the formula

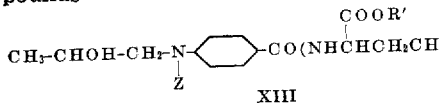

XIII

N-(2-methyl-2-hydroxyethyl)-p-aminobenzoate compound and the N-(3-alkyl-2-hydroxypropyl)-p-aminobenzoate Compounds XIV having the formula

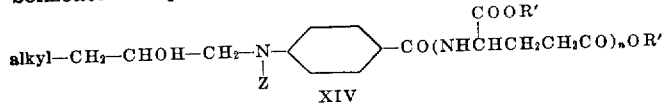

XIV

N-(3-alkyl-2-hydroxypropyl)-p-aminobenzoate compound which are also of value as starting compounds in the process of the present invention are described and claimed, and a method for their preparation is given, inconcurrently filed copending application Serial No. 180,501. According to the method there described a p-aminobenzoate ester compound having the Formula XI given above is reacted with a 1,2-epoxyalkane (XV) having the formula

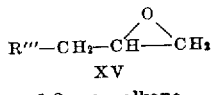

XV 1,2-epoxyalkane wherein R''' is selected from the class consisting of hydrogen and the alkyl radicals. The reaction is carried out conveniently by warming a mixture of the reactants, preferably with the addition of a small proportion of a tertiary amine to catalyze the reaction. Hydrolysis of the ester gives the free acid.

The N-(2-hydroxypropyl)-p-aminobenzoate Compounds I which are esters can be hydrolyzed readily to the corresponding acids with dilute alkalies and the compounds which are acids can be converted to the alkyl esters with suitable esterifying agents. The N-(2-hydroxypropyl)-p-aminobenzoate Compounds I which are arylsulfonyl derivatives can be converted to the free aromatic amines by treatment with hydrogen bromide in an aliphatic acid medium, and in the presence of a bromide acceptor, by the method described and claimed in copending application Serial No. 41,883 and the free amines can be converted to the arylsulfonyl derivatives using an arylsulfonyl halide and an alkali in conventional manner.

The N-(2-hydroxypropyl)-p-aminobenzoate compounds having the Formula I wherein Z is an arylsulfonyl radical are of particular value in carrying out the process of the present invention and the N-(2-ketopropyl)-p-aminobenzoate compounds having the Formula II which are thus formed by the process are of particular value in carrying out subsequent reactions. Such hydroxy and keto compounds having the aromatic group protected with an arylsulfonyl radical are often not subject to decomposition and the formation of by-products when employed as a reactant, e. g. when a hydroxy compound is oxidized according to the method herein described or when a keto compound is condensed with 2,4,5-triamino-6-hydroxypyrimidine, to nearly the same extent as are compounds in which the aromatic amino group is unprotected. Following the carrying out of a reaction using a compound containing such an arylsulfonyl group, the latter can be split from the molecule formed, as mentioned previously, with hydrogen bromide to form the free amine, often in high yield.

Although the invention has been described in the case of compounds containing an arylsulfonyl radical with particular reference to compounds containing the p-toluenesulfonyl radical, it is understood that the invention contemplates the use and formation of starting and final compounds containing other arylsulfonyl radicals, such as the o-toluenesulfonyl, benzenesulfonyl and naphthalenesulfonyl radicals as well as many others. The process can also be carried out using compounds containing arylsulfonyl radicals having substituents, such as chlorine, bromine, or a nitro group, on the aromatic nucleus provided only that the substituent is non-reactive under the reaction conditions.

The preferred arylsulfonyl radical is the p-toluenesulfonyl radical because of its low cost and ready availability and because it has been found that higher yields of amine are often formed when splitting a p-toluenesulfonylamino compound than when splitting certain other arylsulfonyl derivatives of the same amino compound. It should be mentioned, furthermore, that the method involved in the present invention can be carried out and the corresponding N-(2-ketopropyl)-p-aminobenzoate compounds prepared using starting compounds wherein the arylsulfonyl radical is replaced by an alkylsulfonyl, aralkylsulfonyl or a cycloalkylsulfonyl radical, such as the methanesulfonyl, alpha-toluenesulfonyl or cyclohexysulfonyl radicals, respectively.

Although the benzoic acid ester or glutamic acid ester residues present in the compounds prepared by the method of the invention, and in the starting compounds used, can comprise any alkyl ester, such as the methyl, ethyl, n-propyl, isopropyl, n-butyl, tert.-butyl, amyl, lauryl, dodecyl, and many other esters, the preferred ester is the ethyl ester due to matters of convenience and economy. Although the invention is directed, particularly in the case of esters of the glutamic acid residues, to alkyl esters, the process of the invention can also be carried out and corresponding compounds prepared using other esters, such as the phenyl, tolyl, xylyl, cyclohexyl, benzyl, and many other aryl, aralkyl or cycloalkyl esters.

Certain advantages of the invention are apparent from the following examples which are given by way of illustration only and are not to be construed as limiting.

*Example 1.—Diethyl N'-(N-(p-toluenesulfonyl)-p-aminobenzoyl)-1-glutamate*

Thirty and nine-tenths grams of N-(p-toluenesulfonyl)-p-aminobenzoyl chloride and 23.9 grams of diethyl 1(+)-glutamate hydrochloride were dissolved in 300 milliliters of ethylene dichloride and the solution cooled to between 0° and 10° C. The cold solution was stirred vigorously and 22.3 grams of triethylamine in 72 milliliters of ethylene dichloride was added slowly over a period of about 20 minutes. The temperature of the mixture was held between 10° and 20° C. during the addition of the triethylamine and the mixture then allowed to stand at room temperature for one hours. The mixture was then washed successively with water, dilute hydrochloric acid, saturated aqueous sodium bicarbonate and finally with water. The colorless solution thus obtained was dried with anhydrous sodium sulfate and naphtha was added until the solution became opalescent. The mixture was then cooled to cause crystallization and filtered. The crystals, after drying, consisted of 36 grams of diethyl N' - (N - (p - toluenesulfonyl) - p - aminobenzoyl)-1-glutamate melting at 124° to 126° C.

*Example 2.—Diethyl N'-(N-(3-acetoxy-2-hydroxypropyl)-N-(p-toluenesulfonyl)-p-aminobenzoyl)-glutamate*

A mixture consisting of 8 grams of glycidol acetate, 30 grams of diethyl N'-(N-(p-toluenesulfonyl)-p-aminobenzoyl)-glutamate and 5 drops of pyridine was stirred at 145° C. for 23 minutes. The mixture was partially cooled and dissolved in 100 milliliters of ethyl acetate. The solution was washed successively with dilute hydrochloric acid, water, 5 per cent aqueous sodium bicarbonate and water and then dried. Upon evaporation of the solvent there were obtained 33.5 grams of diethyl N'-(N-(3-acetoxy-2-hydroxypropyl)-N-(p-toluenesulfonyl)-p-aminobenzoyl)-glutamate in the form of a viscous yellow oil.

*Example 3.—Diethyl N'-(N-(3-acetoxy-2-ketopropyl) - N - (p - toluenesulfonyl) - p - aminobenzoyl)-glutamate*

The crude diethyl N'-(N-(3-acetoxy-2-hydroxypropyl) - N - (p - toluenesulfonyl) - p - aminobenzoyl)-glutamate, prepared by the method of Example 2 from 23.8 grams of diethyl N'-(N - (p - toluenesulfonyl) - p - aminobenzoyl)-glutamate and 6.4 grams of glycidol acetate, was dissolved in 180 milliliters of benzene and added with vigorous stirring at 24° to 26° C. to a solution of 26 grams of sodium dichromate and 35 milliliters of concentrated sulfuric acid in 115 milliliters of water. Stirring was continued at the same temperature for about 2 hours, the mixture was allowed to stand and the layers which formed were separated. The benzene layer was diluted with 100 milliliters of ethyl acetate, washed with water and dried over anhydrous sodium sulfate. The solvent was evaporated and there were thus obtained 27.5 grams of diethyl N'-(N-(3-acetoxy-2-ketopropyl)-N-(p-toluenesulfonyl)-p-aminobenzoyl)-glutamate as a colorless oil.

Similar results are obtained when the sulfuric acid is replaced entirely or in part with phosphoric acid.

*Example 4.—Ethyl N-(3,3-diethoxy-2-hydroxypropyl) - N - (p - nitrobenzenesulfonyl) - p - aminobenzoate*

A mixture of 12 grams of ethyl N-(p-nitrobenzenesulfonyl)-p-aminobenzoate, 5.8 grams 1,2-epoxy-3,3-diethoxypropane and 3 drops of pyridine was heated at about 135° C. for two hours. The reaction mixture was dissolved in 60 milliliters of hot isopropanol and stored over night in a refrigerator. The mixture was then filtered and the crystals were washed on the filter with a small amount of cold isopropanol and dried. There were thus obtained 15.9 grams of ethyl N-(3,3 - diethoxy - 2 - hydroxypropyl)-N-(p-nitrobenzenesulfonyl)-p-aminobenzoate melting at 109° to 112° C.

*Example 5.—Ethyl N-(3,3-diethoxy-2-ketopropyl) - N - (p - nitrobenezenesulfonyl) - p-aminobenzoate*

A mixture of 4.96 grams of ethyl N-(3,3-diethoxy - 2 - hydroxypropyl) - N - (p - nitrobenzenesulfonyl)-p-aminobenzoate, 23 milliliters of toluene, 10 milliliters of chlorobenzene, 4 milliliters of glacial acetic acid, 23 milliliters of water and 5.26 grams of sodium dichromate was stirred at 2° to 5° C. for three hours. The reaction mixture was then allowed to stand and the layers which formed were separated. The aqueous layer was discarded and the organic layer was washed thoroughly with water, dried and the solvent volatilized. There were thus obtained 3.15 grams of ethyl N-(3,3-diethoxy-2-ketopropyl)-N-(p-nitrobenzenesulfonyl)-p-aminobenzoate in the form of a viscous yellow oil.

*Example 6.—Ethyl N-(3,3'-diethoxy-2-ketopropyl)-p-aminobenzoate*

Eight and one quarter grams of ethyl-p-aminobenzoate were melted and 7.3 grams of the diethyl acetal of 2,3-oxidopropanal were added. The molten mixture was stirred for 2 minutes and 5 drops of pyridine added. The mixture was then stirred for an additional two hours at 95° to 100° C., two additional drops of pyridine were added and stirring was continued for 15 minutes at 105° C. The mixture was then cooled somewhat and 191 milliliters of chlorobenzene were added to dissolve the ethyl N-(3,3-diethoxy-2-hydroxypropyl)-p-aminobenzoate which was formed.

The chlorobenzene solution was added slowly with vigorous stirring to a solution of 26.35 grams of crystalline sodium dichromate and 34.5 milliliters of concentrated sulfuric acid in 115 milliliters of water. The temperature was maintained at 8° to 10° C. during the mixing operation and the mixture was then stirred at 2° to 5° C. for 3 hours. The mixture was then allowed to stand and the layers which formed were separated. The aqueous layer was washed twice with 100-milliliter portions of ethyl acetate and the washings added to the chlorobenzene layer. The chlorobenzene layer was then washed three times with 200-milliliter portions of a mixture of equal volumes of water and saturated sodium chloride solution, dried and the solvent evaporated. There were thus obtained 3.06 grams of ethyl N-(3,3-diethoxy-2-ketopropyl)-p-aminobenzoate in the form of a deep red viscous product.

*Example 7.—Ethyl N-(3,3-diethoxy-2-hydroxypropyl) - N - (p - toluenesulfonyl) - p - aminobenzoate*

A mixture of one gram of the diethyl acetal of 2,3-oxidopropanal, 1.5 grams of ethyl N-(p-toluenesulfonyl)-p-aminobenzoate and two drops of pyridine was heated for twelve minutes at 130°–135° C. The clear melt which was formed was cooled and seeded with crystals of previously prepared ethyl N-(3,3-diethoxy-2-hydroxypropyl)-N-(p-toluenesulfonyl)-p-aminobenzoate. The partially crystalline mass was triturated with a mixture of six milliliters of petroleum naphtha and three milliliters of isopropanol and the mixture filtered. There were thus obtained 1.71 grams of ethyl N-(3,3-diethoxy-2-hydroxypropyl) - N - (p - toluenesulfonyl)-p-aminobenzoate melting at 89°–94° C. Repeated recrystallization of the product from isopropanol-petroleum naphtha raised the melting point to 91°–94° C. Hydrolysis of the ester with dilute alkali yields N-(3,3-diethoxy - 2 - hydroxypropyl) - N - (p - toluenesulfonyl)-p-aminobenzoic acid.

*Example 8.—Ethyl N-(3,3-diethoxy-2-ketopropyl)-N-(p-toluenesulfonyl)-p-aminobenzoate*

A fused mixture of 8.25 grams of ethyl p-aminobenzoate, 7.3 grams of the diethyl acetal of 2,3-oxidopropanol and 5 drops of pyridine was stirred at 120° to 130° C. for about 2 hours. The mixture was cooled and 16 milliliters of pyridine added. Ten and one-half grams of p-toluenesulfonyl chloride were then added gradually and the mixture held at 60° to 70° C. for about 2.5 hours. The pyridine was then distilled in vacuo. The residue, containing ethyl N-(3,3-diethoxy-2-hydroxypropyl) - N - (p - toluenesulfonyl) - p - aminobenzoate, was dissolved in 150 milliliters of toluene and the solution added gradually with vigorous agitation at 5° to 10° C. to a solution of 26.3 grams of crystalline sodium dichromate and 34.5 milliliters of concentrated sulfuric acid in 191 milliliters of water. The mixture was then stirred for about 3 hours at 2° to 5° C. and filtered. There were recovered on the filter 10 grams of ethyl N-(p-toluenesulfonyl)-p-aminobenzoate.

The two layers which formed in the filtrate were separated and the aqueous layer was washed twice with 50-milliliter portions of toluene. The washings and the toluene layer from the filtrate were combined and the solution washed three times with 100-milliliter portions of water and eventually dried by filtering through anhydrous sodium sulfate. Upon distillation of the solvent there were obtained 9.17 grams of ethyl N-(3,3-diethoxy - 2 - ketopropyl) - N - p - toluenesulfonyl)-p-aminobenzoate in the form of a dark yellow non-crystalline substance.

*Example 9.—Diethyl N'-(N-(3,3-diethoxy-2-ketopropyl)-p-aminobenzoyl)-1-glutamate*

A mixture of 3.22 grams of diethyl N'-(p-aminobenzoyl)-1-glutamate, 1.6 grams of the diethyl acetal of 2,3-oxidopropanal and 5 drops of pyridine was stirred for two hours at 150° to 160° C. The mixture was then cooled to 100° C. and dissolved in 38 milliliters of toluene. The toluene solution was added slowly with vigorous stirring to a solution of 5.26 grams of crystalline sodium dichromate and 6.91 milliliters of concentrated sulfuric acid in 23 milliliters of water. The mixture was stirred for about three hours at 2° to 5° C.

The mixture was allowed to stand and the layers which formed were separated. The toluene layer was found to contain no product and was discarded. The aqueous layer was diluted with 100 milliliters of water and extracted with 100 milliliters of ethyl acetate. The extracted aqueous solution was adjusted to pH 6.8 with 8 per cent aqueous sodium hydroxide and the mixture then centrifuged. The precipitate was washed thoroughly with ethyl acetate and the filtrate from the centrifuge was extracted twice with 100-milliliter portion of ethyl acetate. The four ethyl acetate fractions were combined and washed three times with 150 milliliter portions of water. The washed ethyl acetate solution was then centrifuged to remove a small amount of insoluble matter, dried and concentrated to give 2.02 grams of a dark residue containing diethyl N'-(N-(3,3-diethoxy - 2 - ketopropyl) - p - aminobenzoyl)-1-glutamate.

Upon condensing this substance with 2,4,5-triamino-6-hydroxypyrimidine and hydrolyzing the product with alkali, there was obtained a product having folic acid activity as determined by microbiological assay.

*Example 10.—Diethyl N'-(N-(3,3-diethoxy-2-hydroxypropyl) - N - (p - toluenesulfonyl) - p - aminobenzoyl)-1-glutamate*

One and six-tenths grams of the diethyl acetal of 2,3-oxidopropanal and five drops of pyridine were added to 4.77 grams of fused diethyl N'-(N-(p - toluenesulfonyl) - p - aminobenzoyl) - 1 - glutamate at 140° C. The mixture was stirred for about 30 minutes at 145° to 150° C. The highly colored mass consisted chiefly of diethyl N' - (N - (3,3 - diethoxy - 2 - hydroxypropyl) - N - (p - toluenesulfonyl) - p - aminobenzoyl) - 1 glutamate. It had an index of refraction without further purification of $N_D^{30}=1.527$. N'-(N-(3,3 - diethoxy - 2 - hydroxypropyl) - N - (p - toluenesulfonyl) - p - aminobenzoyl) - 1 - glutamic acid is formed by hydrolyzing the ester with dilute alkali.

*Example 11.—Diethyl N'-(N-(3,3-diethoxy-2-ketopropyl) - N - (p - toluenesulfonyl) - p - aminobenzoyl)-glutamate*

A solution of 3.13 grams of diethyl N'-(N-(3,3 - diethoxy - 2 - hydroxypropyl) - N - (p - toluenesulfonyl) - p - aminobenzoyl) - glutamate in 19.1 milliliters of benzene was added slowly and with vigorous stirring at a temperature of 2° to 5° C. to a solution of 2.46 grams of crystalline sodium dichromate and 3.46 milliliters of concentrated sulfuric acid in 11.6 milliliters of water. The mixture was then stirred for an additional three hours at 2° to 5° C. The mixture was then allowed to stand and the layers which formed were separated. The aqueous layer was extracted twice with 20-milliliter portions of benzene and the extracts added to the benzene layer from the reaction mixture. The benzene layer was washed with water, then with aqueous sodium bicarbonate and finally with water. The washed solution was dried and the benzene evaporated. There were thus obtained 2.79 grams of diethyl N'-(N-(3,3-diethoxy-2-ketopropyl)-N-(p - toluenesulfonyl) - p - aminobenzoyl) - glutamate in the form of a yellowish non-crystalline residue.

*Example 12.—Diethyl N'-(N-(3,3-diethoxy-2-ketopropyl) - N - (p - toluenesulfonyl) - p - aminobenzoyl)-1-glutamate*

A solution of 5.86 grams of diethyl N'-(N-(3,3-diethoxy - 2 - hydroxypropyl) - N - (p - toluenesulfonyl)-p-aminobenzoyl)-1-glutamate in 36 milliliters of benzene was added gradually and with stirring to a solution of 4.95 grams of crystalline sodium dichromate, 3.61 milliliters of glacial acetic acid and 6.5 milliliters of concentrated sulfuric acid in 21.7 milliliters of water. The addition was carried out at 22° to 24° C. and the mixture then stirred at about the same temperature for 7.5 hours. The mixture was then allowed to stand and the layers which formed were separated. The benzene layer was diluted with 36 milliliters of ethyl acetate and the solution then washed twice with water, once with saturated aqueous sodium bicarbonate solution and finally with water. The washed benzene solution was then dried by shaking with 100 milliliters of saturated aqueous sodium chloride and filtering through anhydrous sodium sulfate. After evaporating the benzene and ethyl acetate there were obtained 3.8 grams of diethyl N'-(N-(3,3 - diethoxy - 2 - ketopropyl) - N - (p - toluenesulfonyl) - p - aminobenzoyl) - 1 - glutamate in the form of a light yellow non-crystalline solid.

Condensation of the product with 2,4,5-triamino-6-hydroxypyrimidine followed by hydrolysis of the ester groups and splitting of the p-toluenesulfonylamino group gave 2.09 grams of a crude product containing 56.2 per cent of pteroylglutamic acid as determined by chemical assay.

*Example 13.—Diethyl N'-(N-(3,3-diethoxy-2-ketopropyl) - N - (p - toluenesulfonyl) - p - aminobenzoyl)-1-glutamate*

A solution of 3.12 grams of diethyl N'-(N-(3,3-diethoxy - 2 - hydroxypropyl) - N - (p - toluenesulfonyl) - p- aminobenzoyl) - 1 - glutamate in 11 milliliters of chlorobenzene was added slowly with agitation at 2° to 5° C. to a solution of 1.97 grams of crystalline sodium dichromate and 3.4 milliliters of concentrated sulfuric acid in 8.6 milliliters of water. Agitation was continued for three hours at 2° to 5° C. The product was worked up substantially as by the method described in Example 12 and there were obtained 3.0 grams of diethyl N'-(N-(3,3-diethoxy-2-ketopropyl)-N-(p - toluenesulfonyl) - p - aminobenzoyl) - 1 - glutamate in the form of a light yellow non-crystalline solid. Similar results were obtained using toluene in place of the chlorobenzene.

*Example 14*

Following substantially the procedure of Example 11, N-(3,3-dimethoxy-2-hydroxypropyl)-p-aminobenzoic acid, N-(3-ethoxy-2-hydroxypropyl) - N - (p - chlorobenzenesulfonyl) - p - aminobenzoic acid, N' - (N - (3-ethyl-2-hydroxypropyl)-p-aminobenzoyl)- glutamic acid, N'-(N - (3 - iso - butyl - 2 - hydropropyl) - N - (o - bromobenzenesulfonyl) - p - aminobenzoyl) - glutamic acid, N-(3-ethoxy-2-hydroxypropyl)-p - aminobenzoic acid, N'-(N-(3-n-butoxy-2-hydroxypropyl) - N - (p - toluenesulfonyl) - p - aminobenzoyl) - glutamic acid, N' - (N - (3 - phenoxy - 2 - hydroxypropyl) - N - (p - toluenesulfonyl) - p - aminobenzoyl) - glutamic acid, N' - (N - (3 - naphthoxy - 2 - hydroxypropyl) - N - (benzenesulfonyl) - p - aminobenzoyl) - glutamic acid, N' - (N - (3 - benzyloxy - 2 - hydroxypropyl) - N - (p - toluenesulfonyl) - p - aminobenzoyl) - glutamyl - glutamic acid, N' - (N - (3 - propionoxy - 2 - hydroxypropyl) - N - (p - toluenesulfonyl) - p - aminobenzoyl) - glutamyl - glutamic acid, N' - (N - (3 - n - valeroxy - 2 - hydroxypropyl) - N - (p - toluenesulfonyl) - p - aminobenzoyl) - glutamyl-glutamyl-glutamic acid, N'-(N-(3,3-di-n-butoxy-2-hydroxypropyl - N - (p - nitrobenzenesulfonyl) - p - aminobenzoyl)-glutamic acid and their methyl, ethyl and n-butyl esters are oxidized to form N - (3,3 - dimethoxy -2 - ketopropyl) - p -aminobenzoic acid, N-(3-ethoxy-2-ketopropyl)-N-(p-chlorobenzenesulfonyl)-p-aminobenzoic acid, N'-(N - (3 - ethyl - 2 - ketopropyl) - p - aminobenzoyl) - glutamic acid, N' - (N - (3 - iso-butyl - 2 - ketopropyl) - N - (o - bromobenzenesulfonyl) - p - aminobenzoyl) - glutamic acid, N - (3 - ethoxy - 2 - ketopropyl) - p - aminobenzoic acid, N'-(N-(3-n-butoxy-2-ketopropyl)-N - (p - toluenesulfonyl) - p - aminobenzoyl) - glutamic acid, N' - (N - (3 - phenoxy - 2 - ketopropyl) - N - (p - toluenesulfonyl) - p - aminobenzoyl)-glutamic acid, N'-(N-(3-naphthoxy-2-ketopropyl) - N - (benzenesulfonyl) - p - aminobenzoyl)-glutamic acid, N'-(N-(3-benzyloxy-2-ketopropyl) - N - (p - toluenesulfonyl) - p -aminobenzoyl) - glutamyl - glutamic acid, N'-(N-(3-propionoxy - 2 - ketopropyl) - N - (p - toluenesulfonyl) - p - aminobenzoyl) - glutamyl-glutamic acid, N'-(N-(3-n-valeroxy-2- ketopropyl)-N - (p - toluenesulfonyl) - p - aminobenzoyl) - glutamyl-glutamyl-glutamic acid, N'-(N-(3,3-di-n-butoxy - 2 - ketopropyl) - N - (p - nitrobenzenesulfonyl) - p - aminobenzoyl) - glutamic acid and their methyl, ethyl and n-butyl esters, respectively.

*Example 15.—Diamyl N'-N-(3,3-dibutoxy-2-ketopropyl) - N - (betanaphthalenesulfonyl) - p - aminobenzoyl)-1-glutamate*

A solution of 8.03 grams of diamyl N'-(N-(3,3-dibutoxy - 2 - hydroxypropyl) - N - (betanaphthalenesulfonyl) - p - aminobenzoyl) -1 - glutamate in 31.9 milliliters of chlorobenzene was added to a precooled solution consisting of 4.4 grams of sodium dichromate, 19.3 milliliters of water and 5.8 milliliters of concentrated sulfuric acid. The mixture was stirred vigorously for three hours at 3–5° C. The emulsion which had formed was diluted with 100 milliliters of benzene and 400 milliliters of ethyl acetate was then added gradually whereupon an aqueous and an organic layer formed. The layers were separated and the organic layer was washed three times with an equal volume of a 10 to 15 per cent aqueous sodium chloride solution. The washed organic layer was then dried over anhydrous sodium sulfate, filtered and concentrated. There were thus obtained 6.15 grams of a partially crystalline product. An additional 0.38 gram of product was obtained by extracting the aqueous layer from the reaction mixture and the washings with ethyl acetate. The product was chromatographed over alumina and there was obtained crystalline diamyl N'-(N-(3,3-dibutoxy-2 - ketopropyl) - N - (betanaphthalensulfonyl) - p-aminobenzoyl)-1-glutamate shrinking at 115° C. and melting at 126–130° C.

We claim:

1. The method which includes: mixing a solution of a metal dichromate in an aqueous acid with a solution of an hydroxy compound having the formula:

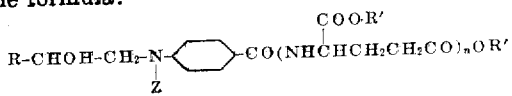

wherein R' is selected from the class consisting of hydrogen and the lower alkyl radicals, n is selected from the class consisting of zero and the positive integers 1 to 3, inclusive, Z is selected from the class consisting of hydrogen and the arylsulfonyl radicals and R is selected from the class consisting of the alkyl, alkoxymethyl, aralkoxymethyl, aralkyoxymethyl, dialkoxymethyl and acyloxy methyl radicals in a substantially water-immiscible organic liquid which is non-reactive under the reaction conditions; and separating from the reaction mixture a keto compound having the formula:

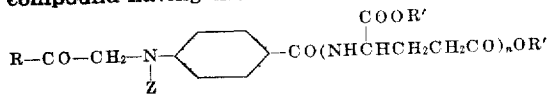

R', n, Z and R having the values given.

2. The method of claim 1 wherein the mixture contains at least two equivalent weights of metal dichromate for each molar weight of hydroxy compound.

3. The method of claim 1 wherein the mixing is carried out at a temperature below about 30° centigrade.

4. The method of claim 1 wherein the acid is sulfuric acid.

5. The method of claim 1 wherein $n$ is the integer 1.

6. The method of claim 1 wherein $n$ is zero.

7. The method of claim 1 wherein the mixing is carried out with vigorous agitation.

8. The method of claim 1 wherein the aqueous solution contains from about 4 to about 9 mols of metal dichromate per liter.

9. The method which includes: mixing a solution of sodium dichromate in aqueous sulfuric acid at a temperature between about —10° and about 30° centigrade with a solution of diethyl N' - (N - (3,3 - diethoxy - 2 - hydroxypropyl) - N - (p - toluenesulfonyl) - p - aminobenzoyl) - glutamate in a substantially water-immiscible organic liquid which is non-reactive under the reaction condition; and separating diethyl N'- (N - (3,3 - diethoxy - 2 - ketopropyl) - N - (p - toluenesulfonyl) - p - aminobenzoyl) - glutamate from the reaction mixture.

10. The method of claim 1, wherein $n$ is 1, Z is arylsulfonyl, R is dialkoxymethyl, and R' is alkyl.

DAVID I. WEISBLAT.
ETHEL I. FAIRBURN.

References Cited in the file of this patent

Lederle Bulletin 13 (No. 3), 21 (1948).

Certificate of Correction

Patent No. 2,650,241                                                        August 25, 1953

DAVID I. WEISBLAT ET AL.

It is hereby certified that error appears in the printed specification of the above numbered patent requiring correction as follows:

Column 1, line 54, for "-(N((" read -(N-((; column 2, line 10, for "-methyl-" read *-methyl)-*; line 33, for "-hydroxyrimidine" read *-hydroxypyrimidine*; line 50, for "3 alkyl-2-3-" read *3-alkyl-2,3-*; column 3, line 14, for "alkoxmethyl" read *alkoxymethyl*; column 5, line 67, for that portion of the formula reading "(NHCHCH$_2$CO)$_n$" read $(NHCHCH_2CH_2CO)_n$; column 7, line 50, for "inconcurrently" read *in concurrently*; column 13, line 67, for "-hydropropyl" read *-hydroxypropyl*; column 14, line 41, Example 15, in the heading, for "Diamyl N'-N-" read *Diamyl N'-(N-*; column 15, line 14, for "aralkoxymethyl, aralkyoxymethyl" read *aryloxymethyl, aralkoxymethyl*; and that the said Letters Patent should be read as corrected above, so that the same may conform to the record of the case in the Patent Office.

Signed and sealed this 3rd day of November, A. D. 1953.

[SEAL]

ARTHUR W. CROCKER,
                                                                *Assistant Commissioner of Patents.*